US006813721B1

(12) United States Patent
Tetreault et al.

(10) Patent No.: US 6,813,721 B1
(45) Date of Patent: Nov. 2, 2004

(54) METHODS AND APPARATUS FOR GENERATING HIGH-FREQUENCY CLOCKS DETERMINISTICALLY FROM A LOW-FREQUENCY SYSTEM REFERENCE CLOCK

(75) Inventors: Mark Tetreault, Webster, MA (US); Michael McLoughlin, Dublin (IE); Jeffrey Somers, Northboro, MA (US)

(73) Assignee: Stratus Computer Systems, S.a.r.l., Luxembourg (LU)

(*) Notice: Subject to any disclaimer, the term of this patent is extended or adjusted under 35 U.S.C. 154(b) by 523 days.

(21) Appl. No.: 09/665,887

(22) Filed: Sep. 20, 2000

(51) Int. Cl.[7] .............................................. G06F 1/12
(52) U.S. Cl. ................... 713/400; 713/500; 709/400
(58) Field of Search ............................ 713/400, 404, 713/500, 501, 502, 503; 709/400; 714/10, 11, 12; 375/354, 356, 362, 371, 373; 327/113, 117, 119, 141, 145

(56) References Cited

U.S. PATENT DOCUMENTS

| 4,589,066 A | * | 5/1986 | Lam et al. ................... 709/400 |
| 4,709,347 A | | 11/1987 | Kirk ............................ 364/900 |
| 5,058,132 A | | 10/1991 | Li ................................. 375/38 |
| 5,125,009 A | * | 6/1992 | DeVilbiss ...................... 375/356 |
| 5,361,277 A | | 11/1994 | Gover ........................... 375/107 |
| 5,461,332 A | | 10/1995 | Mirov et al. ................... 327/41 |
| 5,479,648 A | | 12/1995 | Barbera et al. ............... 395/750 |
| 5,481,573 A | * | 1/1996 | Jacobowitz et al. ......... 375/356 |
| 5,559,459 A | | 9/1996 | Back et al. .................... 326/93 |
| 5,565,816 A | * | 10/1996 | Coteus ............................. 331/2 |
| 5,689,689 A | | 11/1997 | Meyers et al. ............... 395/553 |
| 5,758,134 A | | 5/1998 | Imel et al. .................... 395/556 |
| 5,838,578 A | | 11/1998 | Pippin .......................... 364/488 |
| 5,915,107 A | | 6/1999 | Maley et al. ................. 395/551 |
| 5,982,238 A | | 11/1999 | Söderquist ...................... 331/2 |
| 5,987,620 A | | 11/1999 | Tran ............................ 713/600 |
| 6,055,587 A | | 4/2000 | Asami et al. .................. 710/49 |
| 6,262,695 B1 | * | 7/2001 | McGowan .................... 345/1.1 |

FOREIGN PATENT DOCUMENTS

| EP | 0 596 657 A2 | 5/1994 | ........................ 1/12 |
| EP | 0 845 735 A1 | 6/1998 | ........................ 1/10 |
| EP | 0 974 912 A2 | 1/2000 | ...................... 15/16 |
| JP | 10276362 A | * 10/1998 | ......... H04N/05/232 |

OTHER PUBLICATIONS

Zukowski, C.A.—"High–Speed Data Transmission Using Low–Frequency Clocks"—Circuits and Systems, IEEE Transactions on Vol.: 38 Issue: 3, Mar 1991, Page(s): 273–280.*

* cited by examiner

Primary Examiner—Lynne H. Browne
Assistant Examiner—Thuan Du
(74) Attorney, Agent, or Firm—Testa, Hurwitz & Thibeault, LLP

(57) ABSTRACT

A method and apparatus for maintaining clock phase alignment among system modules of a fault-tolerant computing system. In one embodiment, a low-frequency system reference clock signal is distributed to all system modules where it is multiplied to generate higher-frequency local clock signals. All local clock signals are then synchronized to the rising edge of the reference clock signal and the first rising edge in relation to a timing event is also identified.

20 Claims, 5 Drawing Sheets

METHODS AND APPARATUS FOR GENERATING HIGH-FREQUENCY CLOCKS DETERMINISTICALLY FROM A LOW-FREQUENCY SYSTEM REFERENCE CLOCK

FIELD OF INVENTION

The present invention relates to distributing reference clock signals to individual system modules and more particularly to distributing clock signals to support synchronous system operations.

BACKGROUND OF THE INVENTION

Advances in microprocessor development have resulted in ever-faster processing speeds, now measured in frequencies of hundreds of megacycles-per-second. In systems such as Fault-Tolerant Computers (FTC) operating in a synchronous, lock-step manner, inter-module clock phase alignment is critical. Each of the individual system modules operating at their respective high frequency require a suitable reference clock to allow system synchronization. In addition to phase alignment within lock-step FTC systems, it is also critical that processors maintain their lock step relationship (performing the same instructions on the same clock cycle) through reset events.

One method for ensuring that processors maintain lock-step relationship is to distribute the high-frequency clock directly. Distributing clock signals at high frequencies, however, exposes them to adverse effects of transmission line distortion, system noise and radio-frequency interference. As a result, these high-frequency system clocks can become corrupted to the point that clock phase detection becomes difficult. Further, as clock cycle time shrinks, clock distribution circuitry becomes less tolerant of clock skew and jitter introduced by the distribution circuit. Mitigating these adverse high-frequency effects complicates system design.

A further problem with distributing the high-frequency clock signal directly is that the lower-frequency clock signals that are commonly used by components on a module must be generated. Generating these local timing signals requires dividing the incoming system clock into the one or more lower-frequency clock signals. A common method in systems that distribute lower frequency reference clocks uses a 14.38% MHz reference clock. Intel Pentium-based systems operate at system clock rates that are multiples of 33 MHz (i.e., 33 MHz, 100 MHz, and 133 MHz). Use of the 14.38 MHz reference within the Pentium-based systems unavoidably requires an initial division of the reference clock, because 14.38 MHz is not a common divisor of the Pentium-based system clock rates. The division step adds a differential phase delay between system components. This added delay further complicates system design, because the resulting differential phase delay must be normalized across the components on a module to maintain necessary synchronized, lock-step operation. The present invention avoids these problems.

SUMMARY OF THE INVENTION

The present invention relates to methods and apparatus for distributing clock signals in a multi-module system. One object of this invention is to maintain synchronization of all system modules. In one embodiment of the invention, a single reference clock signal is distributed to each system module, arriving there within a prescribed window of time. Local clock signals are generated at each system module from the reference clock. In one embodiment, a phase locked loop (PLL) is used to generate the local clock signals. One aspect is that the operating frequency of the reference clock signal is a common divisor to all local clock signals. Another aspect is that the rising edge of the local clock signal is coincident with the rising edge of the reference clock signal. Yet another aspect is that signal distribution of the lower frequency reference clock avoids complications associated with distributing a high-frequency reference clock operating at the local clock rates.

In one embodiment of the invention, a master timing signal is provided as a reference. This timing signal is identified as the first rising edge of the system reference clock occurring after a some system event, such as a reset.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention described above, as well as further advantages of the invention, may be better understood by reference to the description taken in conjunction with the accompanying drawings, in which:

DETAILED DESCRIPTION OF THE INVENTION

Figure 1:
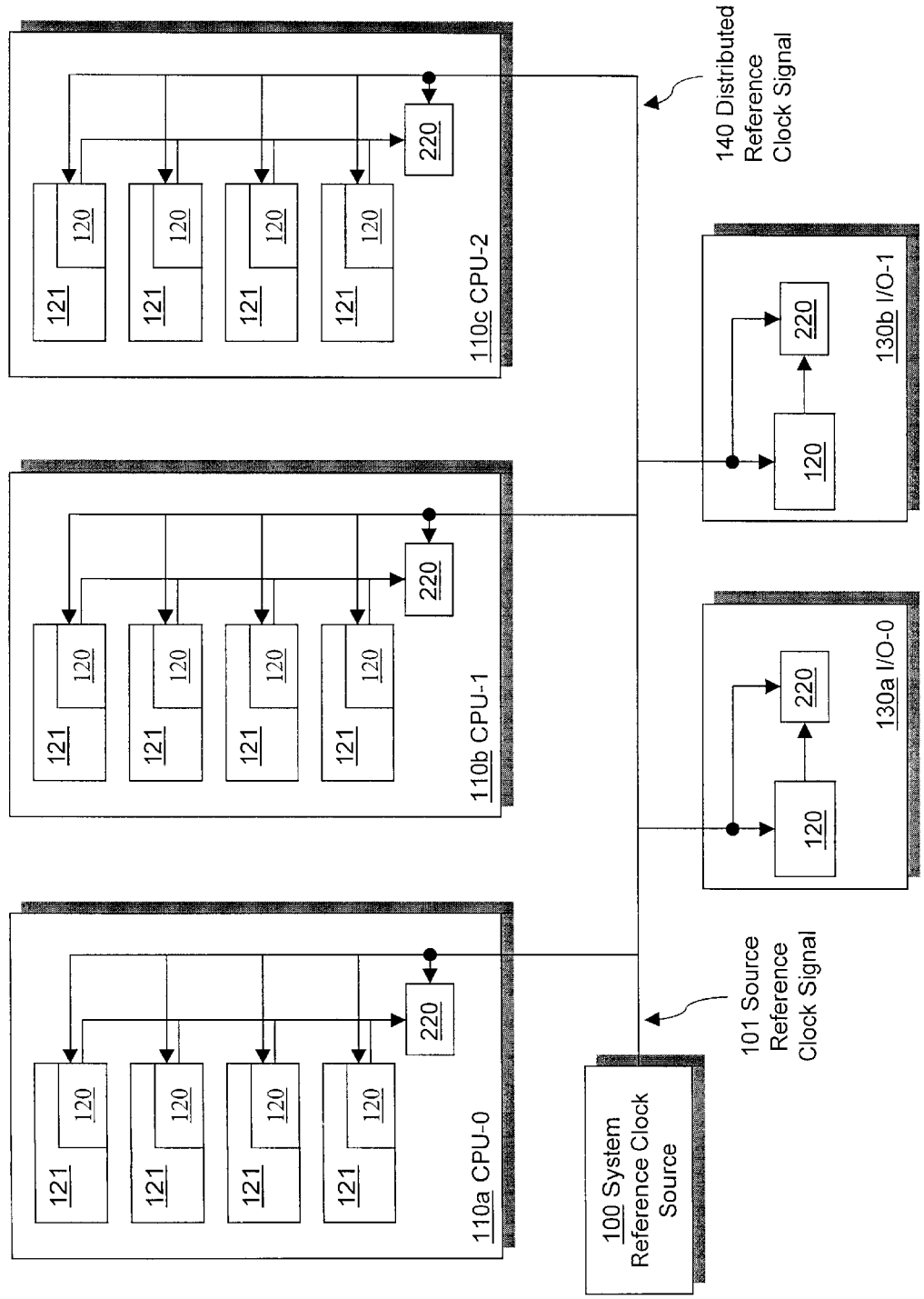
FIG. 1 is a block diagram of an embodiment of a computer system constructed in accordance with the present invention.

FIG. 1 depicts an embodiment of a fault-tolerant computer in which the present invention may be used. The system includes a number of redundant system modules including Central Processor Units (CPU) 110a, 110b, 110c (generally 110) and redundant input/output (I/O) controllers 130a and 130b (generally 130). Like redundant system modules (110 or 130) perform identical operations at any given clock pulse, in what is known as lock-step operation. Inter-module clock synchronization is accomplished by distributing a common, low-frequency, system reference clock signal to each processor and generating local clock signals on each processor.

A central system reference clock source 100 provides a source reference clock signal 101 that is distributed to each system module (110 or 130). A propagation time delay is introduced during the distribution of the source reference clock signal 101 to each of the system modules (110 or 130). This propagation delay results in a time delay, or phase lag, between the distributed reference clock signal 140 received at each of the system modules (110 or 130) and the source reference clock signal 101 broadcast from the system reference clock source 100.

Each CPU 110 and each I/O module 130 may contain one or more processors 121. In one embodiment, each processor 121 contains a local clock generator 120 that receives the distributed reference clock signal 140 and generates a respective local clock signal from this system reference clock signal. In one embodiment, each system module (110 or 130) also has a zero clock detector 220 to identify a particular clock cycle, such as the first clock cycle occurring after a system reset. In some of these embodiments, each processor 121 is associated with a respective zero clock detector 220. In others of these embodiments, a single zero clock detector 220 on a CPU 110 provides a zero clock signal to all processors 121.

Figure 2:
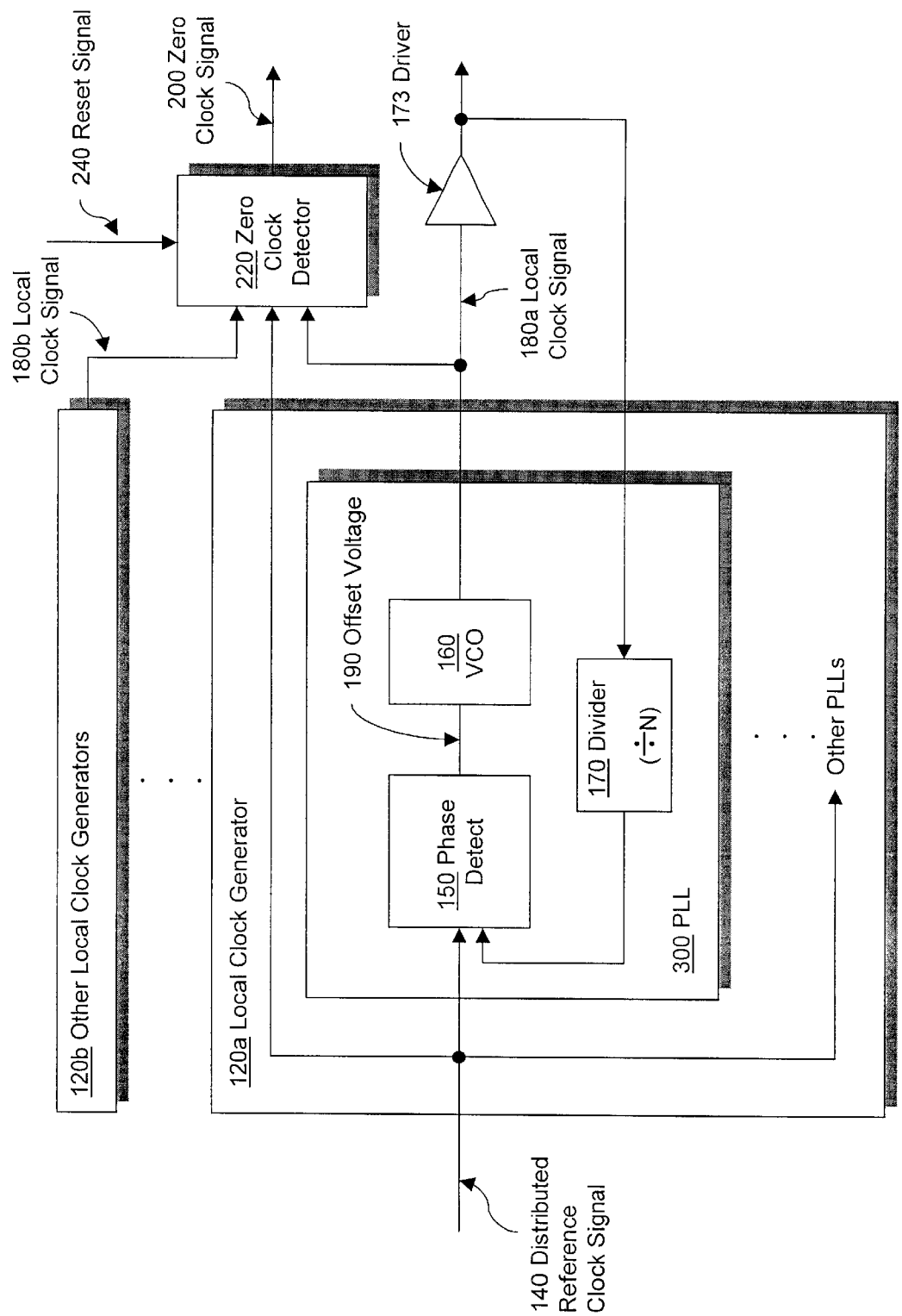
FIG. 2 is a block diagram of a local clock generator constructed in accordance with the present invention.

Referring to FIG. 2, one embodiment of a local clock generator 120 is shown that generates a respective local clock signal 180 from the received distributed reference clock signal 140. In this embodiment, the clock generator 120 includes a phase locked loop (PLL) 300 that operates by accepting the low frequency distributed reference clock signal 140 as an input to a phase detector 150. The phase of the distributed reference clock signal 140 is compared with the phase of the output signal of a frequency divider 170 to generate an offset voltage 190 proportional to the phase difference between the distributed reference clock signal 140 and output signal of the frequency divider 170. The offset voltage 190 is used as an input signal to control a voltage controlled oscillator (VCO) 160 of the PLL 300 to provide a stable high-frequency local clock signal 180. The resulting output high-frequency, local clock signal 180 of the of the PLL 300 maintains a substantially constant phase relationship with the input, distributed reference clock signal 140.

In some embodiments, a zero-delay-buffer PLL 300 may be used, such as an Integrated Circuit Systems, Inc., ICS570 multiplier and zero delay buffer, or an Integrated Circuit Systems, Inc., ICS670 low phase noise zero delay buffer and multiplier. Where a zero delay PLL 300 is used, the output, high-frequency, local clock signal 180 is substantially in-phase with the input, distributed reference clock signal 140. In one embodiment, the rising edges of the local clock signal 180 are substantially coincident with the rising edges of the distributed reference clock signal 140; whereas, in another embodiment, the falling edges of the local clock signal are substantially coincident with the falling edges of the distributed reference clock signal 140.

In the embodiment shown in FIG. 2, the local clock signal 180 is input into a driver 173 device. Signals intended for distribution to other circuits or modules are commonly first input into a signal driver 173, such as an Integrated Circuit Systems, Inc., ICS551 clock buffer. A driver 173, however, typically adds a time delay to an input signal such that the phase of an output signal is a delayed with respect to the phase of the corresponding input signal. For some embodiments, the added delay of a driver 173 may be compensated for where a zero-delay-buffer PLL 300 is used.

In the embodiment shown in FIG. 2, the input signal to the frequency divider 170 is taken from the output of a signal driver 173 to include any signal delay contributions from the driver into the PLL 300 feedback loop. By incorporating the delay contribution of driver 173 into the feedback loop where PLL 300 is a zero delay buffer, the rising edge of driver 173 output signal will be substantially coincident with the rising edge of the distributed reference clock signal 140.

In lock-step operation, like system modules (110 or 130) perform the same operation at substantially the same time, or during the same clock pulse. In addition to synchronizing the local clock signal 180 with the distributed reference clock signal 140, a means is provided to identify a time reference such that a system module (110 or 130) may determine that it is operating on a particular clock pulse. In one embodiment, referring to FIG. 2, a zero clock detector 220 accepts as inputs the distributed reference clock signal 140, the local clock signal 180 and a reset signal 240. The reset signal 240 represents a timing event that prompts the generation of a zero clock signal 200, identifying a particular clock pulse as a reference, or zero clock.

Figure 3:
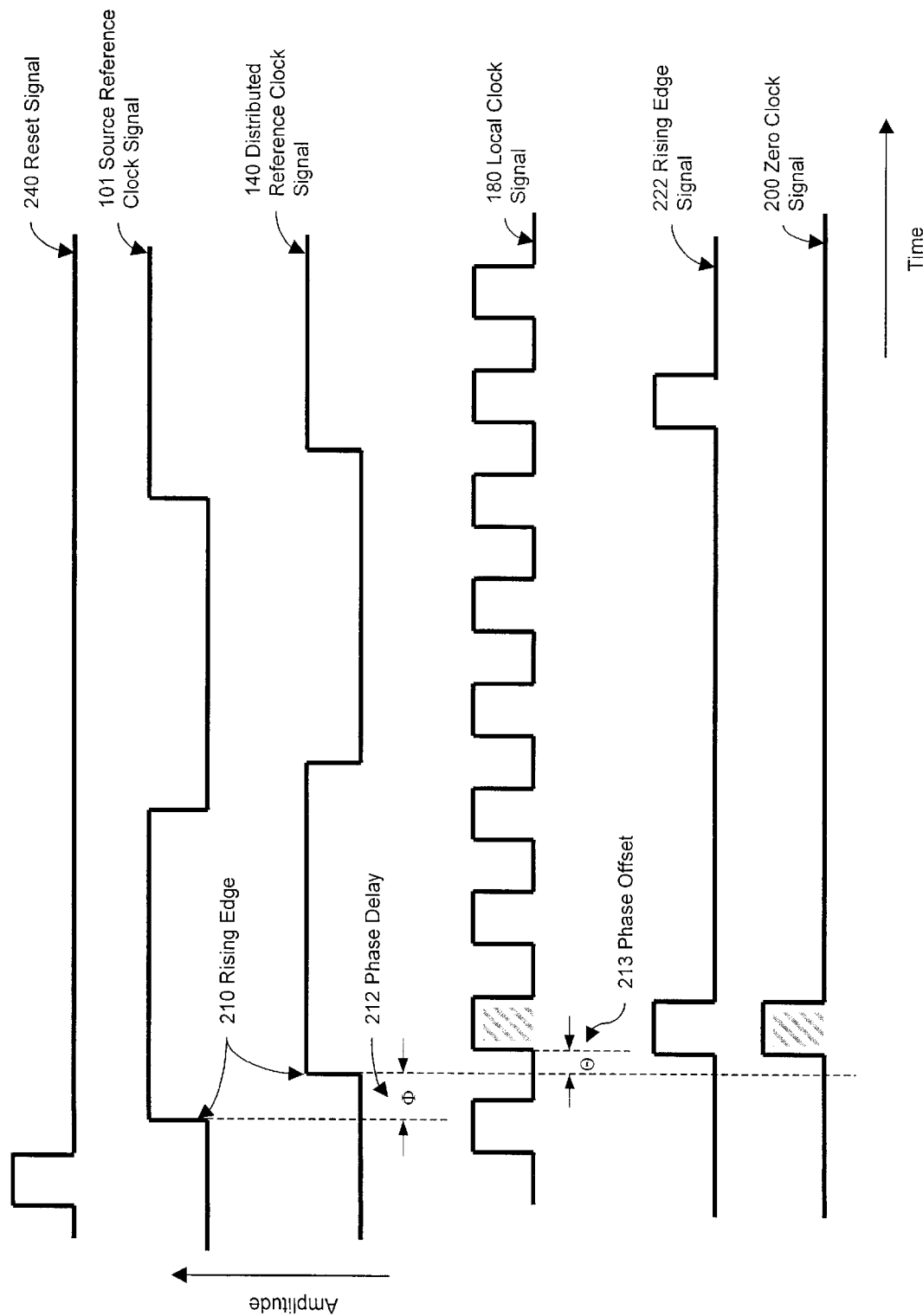
FIG. 3 is a signal timing diagram of a local clock signal, a system reference clock signal and a zero-clock signal generated in accordance with the present invention.

Referring to FIG. 3, in one embodiment, the system timing relationship between the source reference clock signal 101 at the system reference clock source 100 and the distributed reference clock signal 140 at a system module (110 or 130) is shown. In one embodiment, the rising edges 210 of the system source reference clock signal 101 and the distributed reference clock signal 140 are identified and used as a means of determining signal phase. A phase delay 212 at each system module results from the signal propagation delay as the distributed reference clock signal 140 travels from the system reference clock source 100 to the system module (110 or 130). This phase delay 212 is measured as the time difference between the rising edge 210 of the signal at the system reference clock source 101 and the rising edge 210 of the distributed reference clock signal 140 at a system module (110 or 130). The high-frequency local clock signal 180 is shown as synchronized, with the delivered distributed reference clock signal 140 from which it was derived. Although the high-frequency local clock signal 180 and the delivered distributed reference clock signal 140 are synchronized, they do not necessarily have coincident rising edges; embodiments may include a constant phase offset 213. In one embodiment, a rising edge signal 222 provides notification after each rising edge of the distributed reference clock signal 140, while the zero clock signal 200 provides notification of the first rising edge of the distributed reference clock signal 140 to occur after some timing event such as a reset signal 240. Although the discussion of timing reference is limited to the rising edge of clocking signals, other embodiments are anticipated where the falling edge of clocking signals is similarly used for timing reference.

Figure 4:
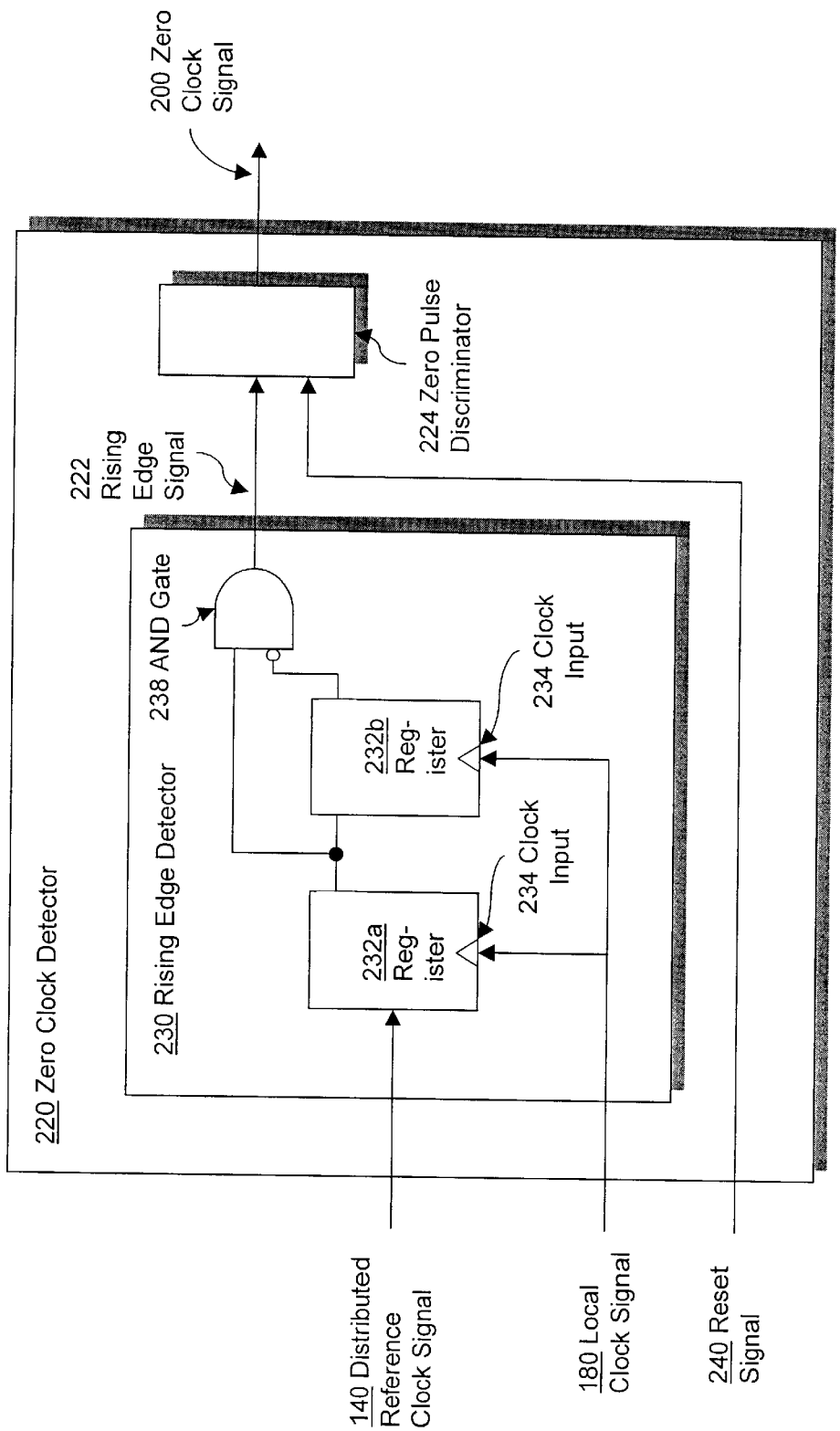
FIG. 4 is a block diagram of a zero-clock detector constructed in accordance with the present invention.

Referring to FIG. 4, one embodiment of a zero clock detector 220 provides as an output a zero clock signal 200 providing notification of the first rising edge of the system reference clock 140 occurring after some timing event, such as a reset signal 240. In one embodiment, a circuit, such as the one shown in FIG. 4, is used to create the zero clock signal 200. This circuit has two principal components: a rising edge detector 230; and a zero pulse discriminator 224. In one embodiment of the rising edge detector 230, the distributed reference clock signal 140 is provided as an input to a first register 232a, while the local clock signal 180 is provided as clock input 234. In this embodiment a phase offset 213, shown in FIG. 3, is provided with a sufficient duration to include the setup and hold time requirement of register 232a and the jitter requirement of local clock signal 180 to ensure that the rising edge of the zero clock pulse of the local clock signal 180 occurs after the rising edge 210 of the distributed reference clock signal 140. The first register 232a provides an updated output after each cycle of the local clock signal 180. The register's 232a output state will remain constant until its input, the distributed reference clock signal 140, changes state. The output of the register 232a is then provided simultaneously to an AND gate 238 and to a second register 232b. Register 232b functions similarly to register 232a and induces a one clock-cycle delay in the register 232a output. The output of the second register 232b is applied to an inverted input of the AND gate 238 resulting in a rising edge signal 222 as an output of the rising edge detector 230. In one embodiment, the rising edge signal 222 consists of a single pulse coincident with each rising edge of the distributed reference clock signal 140. The zero pulse discriminator 224 accepts the rising edge signal 222 and the reset signal 240 as input signals; determines which rising edge signal 222 pulse corresponds to the first pulse occurring immediately after a timing event, such as reset signal 240 state change; and provides an indication within the zero clock signal 200 output.

Alternatively, in another embodiment where a half-cycle delay of the local clock signal 180 is tolerable for the zero clock signal 200, the local clock signal 180 is in-phase, having a zero duration phase offset 213, with the distributed reference clock signal 140. For this embodiment, the registers 232 are clocked on the falling, or negative edge. The half cycle delay from the rising edge 210 of the distributed reference clock signal 140 to the falling edge of the in-phase local clock signal 180 provides the requisite time delay for the register 232 setup and hold time requirement and the clock jitter requirement. In an embodiment where the local clock signal rate is 133 MHz, the additional half-cycle delay would be approximately 4 nanoseconds.

Although clock distribution among system modules is discussed in detail here, one skilled in the art will realize that the present invention may be used in distributing clocks within an individual system module and even within a single electrical circuit board.

EXAMPLE

Figure 5:
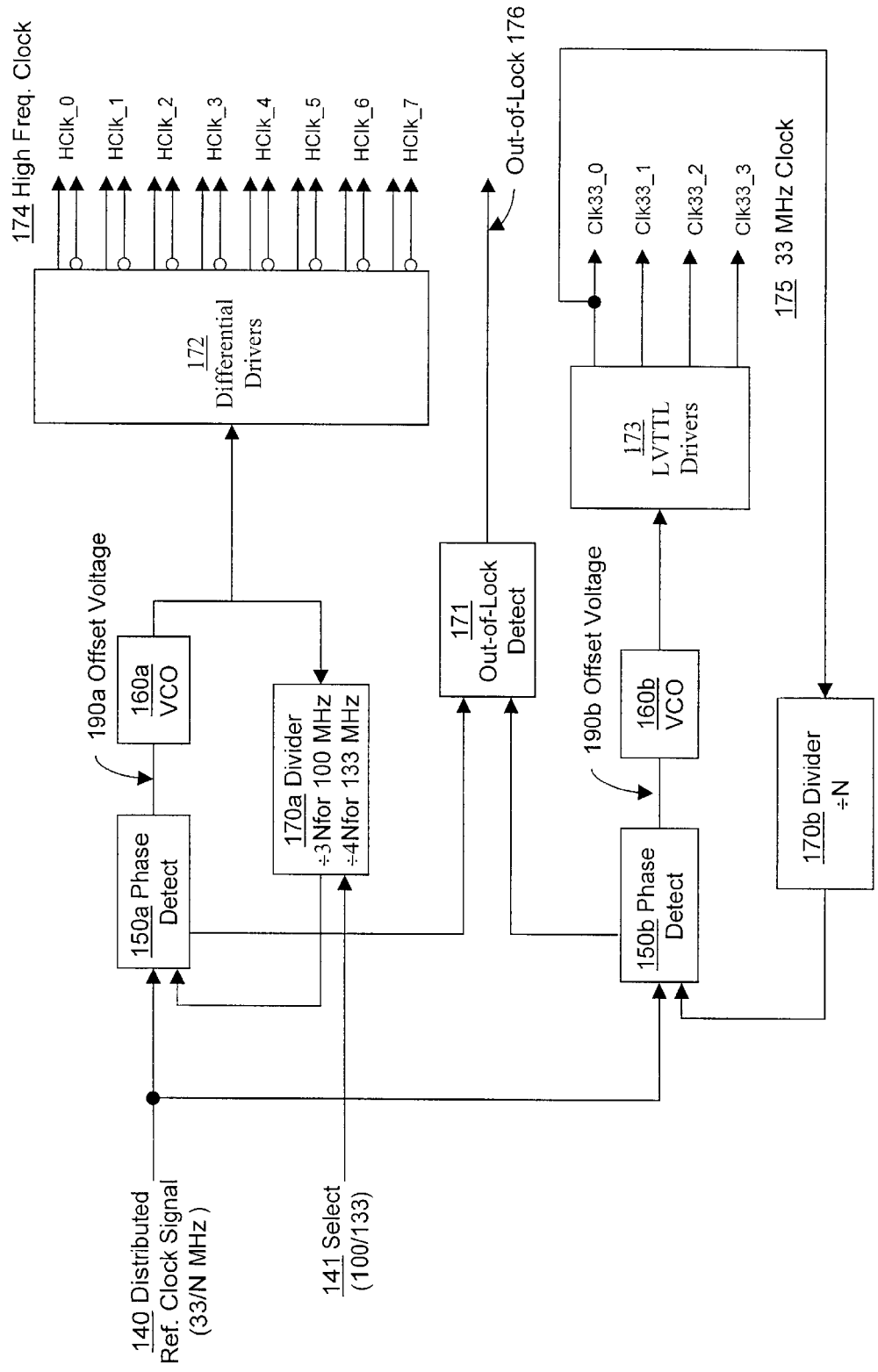
FIG. 5 is a block diagram of a local clock generator constructed in accordance with the present invention.

The following example is one way of using the invention to distribute clock signals in a multi-processor Fault-Tolerant Computer (FTC) system where redundant, multi-processor CPUs 110 are operating in lock step. In this example, the processors are Intel Pentium processors capable of running at clock rates of 100 MHz or 133.33 MHz (generally 133 MHz). Other components comprising the CPU 110 require a lower clock rate of 33.33 MHz (generally 33 MHz). Referring to FIG. 5, a local clock generator 120 comprises two phase-locked loop (PLL) circuits: one generating a selectable high frequency clock 174 for the Pentium processors 110; the other generating a lower frequency 33 MHz clock 175 for other CPU components. The distributed reference clock signal 140 operates at a common divisor rate of 8.33 MHz, derived as 33.33 MHz/N, where N=4. The 8.33 MHz (generally 8 MHz) system reference clock 140 is input into a phase detector 150*a* where it is compared with the phase of the output signal of a frequency divider 170*a* to generate an offset voltage 190*a*. The offset voltage 190*a* is proportional to the phase difference between the 8 MHz distributed reference clock signal 140 and the output of the frequency divider 170*a*. The offset voltage 190*a* is used as an input signal to control the VCO 160*a* of the PLL to provide a stable high frequency local high-frequency clock 174 signal at a selectable value of either 100 MHz or 133 MHz. A select (100/133) 141 signal is input to the divider 170*a* and determines whether the VCO 160*a* produces an output clock rate of 100 MHz or 133 MHz. For the 100 MHz clock, the divider 170*a* determines its 8 MHz input to the phase detect by dividing the 100 MHz VCO 160*a* output by 12 (determined from 3N, where N=4). For a 133 MHz clock, the divider 170*a* determines its 8 MHz input to the phase detect 150*a* by dividing the 133 MHz VCO 160*a* output by 16 (determined from 4N, where N=4). For this example, the Pentium processors 110 require differential clock signals. A differential driver 172 accepts the VCO 160*a* output and produces multiple differential, synchronized high frequency clocks 174.

In the same example, the lower frequency 33 MHz clock 175 used for other CPU components is derived from the same distributed 8 MHz distributed reference clock signal 140. A phase detect 150*b* of a second PLL accepts the 8 MHz distributed reference clock signal 140 and compares it with the phase of the output signal of a frequency divider 170*b* to generate an offset voltage 190*b*. The offset voltage 190*b* is proportional to the phase difference between the 8 MHz distributed reference clock signal 140 and the output of the frequency divider 170*b*. The offset voltage 190*b* is used as an input signal to control the VCO 160*b* of the PLL to provide a stable output at 33 MHz. A Low-Voltage TTL (LVTTL) driver 173 accepts the VCO 160*b* output and produces multiple, synchronized 33 MHz local clocks 175.

Lock step operation further requires that the multiple clock rates produced by the clock generator 120 are synchronized. Referring to FIG. 5, the circuit of this example includes an out-of-lock detect 171 that accepts inputs from both phase detects 150*a* and 150*b* and compares them. The out-of-lock 176 signal from the out-of-lock detect 171 provides system notification to help isolate the cause of a system failure due to loss of PLL lock.

Having shown the preferred embodiments, one skilled in the art will realize that many variations are possible within the scope and spirit of the claimed invention. It is therefor the intention to limit the invention only by the scope of the claims.

What is claimed is:

1. In a system including a plurality of system modules, each module operating at a respective local clock rate, a method for maintaining clock phase alignment, the method comprising the steps of:
   a) providing a system reference clock;
   b) distributing said system reference clock to each of said plurality of system modules within a prescribed window of time;
   c) multiplying at each of said plurality of system modules said system reference clock to generate a respective local clock having said respective local clock rate;
   d) synchronizing said respective local clock for each of said plurality of system modules with said system reference clock; and
   e) identifying a cycle of said respective system reference clock as a zero clock cycle.

2. The method of claim 1, wherein said system reference clock has a rate that is a common divisor of said respective local clock rate.

3. The method of claim 1, wherein said system reference clock has a rising edge and a falling edge, said respective local clock has a rising edge and a falling edge, and at least one of said rising edge and said falling edges of said system reference clock and said respective local clock are substantially coincident.

4. The method of claim 1, wherein said prescribed window of time of said system reference clock is less than a clock skew limit.

5. The method of claim 1, wherein said zero clock cycle is identified by a first rising edge occurring after a timing event.

6. In a system including a plurality of system modules, each module operating at a respective local clock rate, an apparatus for maintaining clock phase alignment comprising:
   a) a system reference clock source providing a system reference clock having a system reference clock rate;
   b) a system reference clock distribution network to deliver said system reference clock to said plurality of system modules within said prescribed window of time;

c) a local clock generator for generating said respective local clock rates from said system reference clock source;

d) a synchronizer for synchronizing said respective local clock rates for each of said plurality of system modules with said system reference clock rate of said system reference clock; and e) a zero clock cycle detector for identifying a cycle of said system reference clock as a zero clock cycle.

7. The apparatus of claim 6 wherein said system reference clock rate of said system reference clock source is a common divisor of said respective local clock rates.

8. The apparatus of claim 6 wherein said local clock generator includes a phase locked loop.

9. The apparatus of claim 8 wherein the phase locked loop further comprises a zero delay buffer phase locked loop.

10. The apparatus of claim 8 wherein the phase locked loop further comprises at least one of a phase detector, a voltage controlled oscillator, and a frequency divider.

11. The apparatus of claim 10 wherein the phase detector compares phases to generate an offset voltage proportional to any phase differences between said system reference clock and any output signal of said frequency divider.

12. The apparatus of claim 6 wherein said local clock generator generates at least one local clock signal having said local clock rate.

13. The apparatus of claim 12 wherein the synchronization further comprises a phase offset between said local clock signal and said system reference clock signal.

14. The apparatus of claim 6 wherein said zero clock cycle detector receives a plurality of clock signals.

15. The apparatus of claim 14 wherein said zero clock cycle detector receives said system reference clock, at least one local clock signal, and a reset signal.

16. The apparatus of claim 15 wherein said reset signal represents a timing event that prompts generation of a zero clock signal.

17. The apparatus of claim 6 wherein said zero clock cycle detector further comprises a rising edge detector and a zero pulse discriminator.

18. The apparatus of claim 6 wherein said local clock generator further comprises a high frequency phase locked loop circuit generating a selectable high frequency clock signal.

19. The apparatus of claim 6 wherein said local clock generator further comprises a low frequency phase locked loop circuit generating a lower frequency clock signal.

20. The apparatus of claim 6 further comprising an out-of-lock detect providing notification when a failure occurs due to loss of phase lock.

* * * * *